United States Patent [19]
Johlie et al.

[11] Patent Number: 5,279,521
[45] Date of Patent: Jan. 18, 1994

[54] DYNAMIC GROUP REGROUPING METHOD

[75] Inventors: Anne M. Johlie, Chicago; Stanley W. Dorcey, Wheeling; Daniel J. McDonald, Cary, all of Ill.

[73] Assignee: Motorola, Inc., Schaumburg, Ill.

[21] Appl. No.: 841,675

[22] Filed: Feb. 26, 1992

[51] Int. Cl.⁵ .............................................. H04B 7/00
[52] U.S. Cl. ............................... 455/34.1; 455/53.1; 455/56.1; 455/57.1
[58] Field of Search .................... 455/33.1, 34.1, 34.2, 455/54.1, 54.2, 56.1, 57.1, 53.1; 379/63

[56] References Cited

U.S. PATENT DOCUMENTS

| | | | |
|---|---|---|---|
| 4,775,999 | 10/1988 | Williams | 455/34.1 |
| 4,817,190 | 3/1989 | Comroe et al. | 455/56.1 |
| 5,014,345 | 5/1991 | Comroe et al. | 455/54.2 |
| 5,034,993 | 7/1991 | Sasuta et al. | 455/34.1 |
| 5,117,501 | 5/1992 | Childress et al. | 455/34.1 |

*Primary Examiner*—Reinhard J. Eisenzopf
*Assistant Examiner*—Andrew Faile
*Attorney, Agent, or Firm*—Timothy W. Markison; Steven G. Parmelee

[57] ABSTRACT

In a communication system network, the central controller may more efficient respond to group regrouping requests in the following manner. Once a console generates a dynamic group regrouping request which requests the regrouping of a set of communication groups into a super group, the central controller determines, for each communication system, whether at least one of the set of communication groups is registered in that communication system. When at least one of the set of communication groups is registered in the communication system, the central controller groups the at least one of the set of communication groups into a local super communication group. Having done this, the central controller then generates super communication group information and transmits it to the communication systems but only that portion that pertains to the local super communication group.

7 Claims, 2 Drawing Sheets

DYNAMIC GROUP REGROUPING METHOD

FIELD OF THE INVENTION

This invention relates generally to communication system networks and in particular to a method that allows a central controller of the communication system network to dynamically regroup existing communication groups.

BACKGROUND OF THE INVENTION

Communication system networks are known to comprise a plurality of communication systems and a central controller. Each of the communication systems comprises a plurality of communication units, a limited number of communication resources that are transceived via a limited number of repeaters, and a communication resource allocator that allocates the communication resources among the plurality of communication units. The communication units, which may be mobile radios, portable radios, and/or portable radio/telephones, are typically arranged in to communication groups and are generally located throughout the communication system network. Of the communication resources, which may be TDM slot locations, frequency carriers, pair of frequency carriers, or any other RF transmission means, one is selected to function as a control channel. The control channel transceives operational information between the communication units and the central controller via the communication resource allocators.

As is known, a communication unit may establish a communication with other communication units within the communication system network by transmitting an inbound signalling word (ISW) to the central controller via the communication resource allocator of the communication system that the communication unit is located in. Upon receiving the request, the central controller processes it and, if the request is valid, the central controller allocates a communication resource in each of the communication systems that have a communication unit of the targeted talk group in it. The communication systems, which may also be communication sites, are coupled to and controlled by the central controller. If a communication system, or site, loses contact with the central controller, the communication system, or site, operates as an independent communication system but only for communication units that are located within its coverage area.

As is also known, under certain circumstances, communication groups that normally do not communicate with each other may be combined into one group to more efficiently respond to a particular situation. For example, when an emergency condition arises, an operator of a operator station, or console, may elect to combine separate communication groups into one to respond to the emergency condition. Thus, the operator of the console may combine the communication groups of the police department, fire department and state patrol into one communication group to respond to the emergency. When the operator of the console selects to combine groups, commonly known as regrouping, the consoles transmits the request to the central controller. Upon receiving the request, the central controller processes it by regrouping the selected groups in to a super group and allocating a communication resource in each of the communication systems, or sites, to the regrouped communication group whether or not a communication unit of the super group is located within that communication system. This unfortunately wastes communication resources.

In addition, some communication system networks, in each communication system, allocate a communication resource for each communication group of the super group and combine the signalling at the central controller such that, to the communication units, it appears they are all talking on one resource. This becomes very inefficient when a communication system, or site, does not have communication units of all communication groups of the super group located in it. Therefore, a need exists for a method that will allow the central controller to allocate only one communication resource in each communication system that has a communication unit of a communication group of the super group located in it.

SUMMARY OF THE INVENTION

These needs and others are substantially met by the dynamic group regrouping method disclosed herein. In a network of communication systems that are operably coupled via a central controller, wherein each communication system includes a plurality of communication units that are arranged into communication groups, a limited number of communication resources that are transceived via a limited number of repeaters, a plurality of consoles, and a communication resource allocator that allocates the limited number of communication resources among the plurality of communication units, the following describes a method that allows the central controller to process dynamic group regrouping on a communication system by communication system basis. The process begins when a console generates a dynamic group regrouping request, wherein the dynamic group regrouping request comprises a set of communication groups that are to be combined in to a super communication group. The central controller subsequently determines for each communication system whether at least one of the set of communication groups is registered in the communication system. When at least one of the set of communication groups is registered in a communication system, the central controller groups the at least one of the set of communication groups into a local super group. Having done this, the central controller generates super communication group information and transmits it to each communication system but only the portion that pertains to the local super communication group.

DESCRIPTION OF A PREFERRED EMBODIMENT

Figure 1:
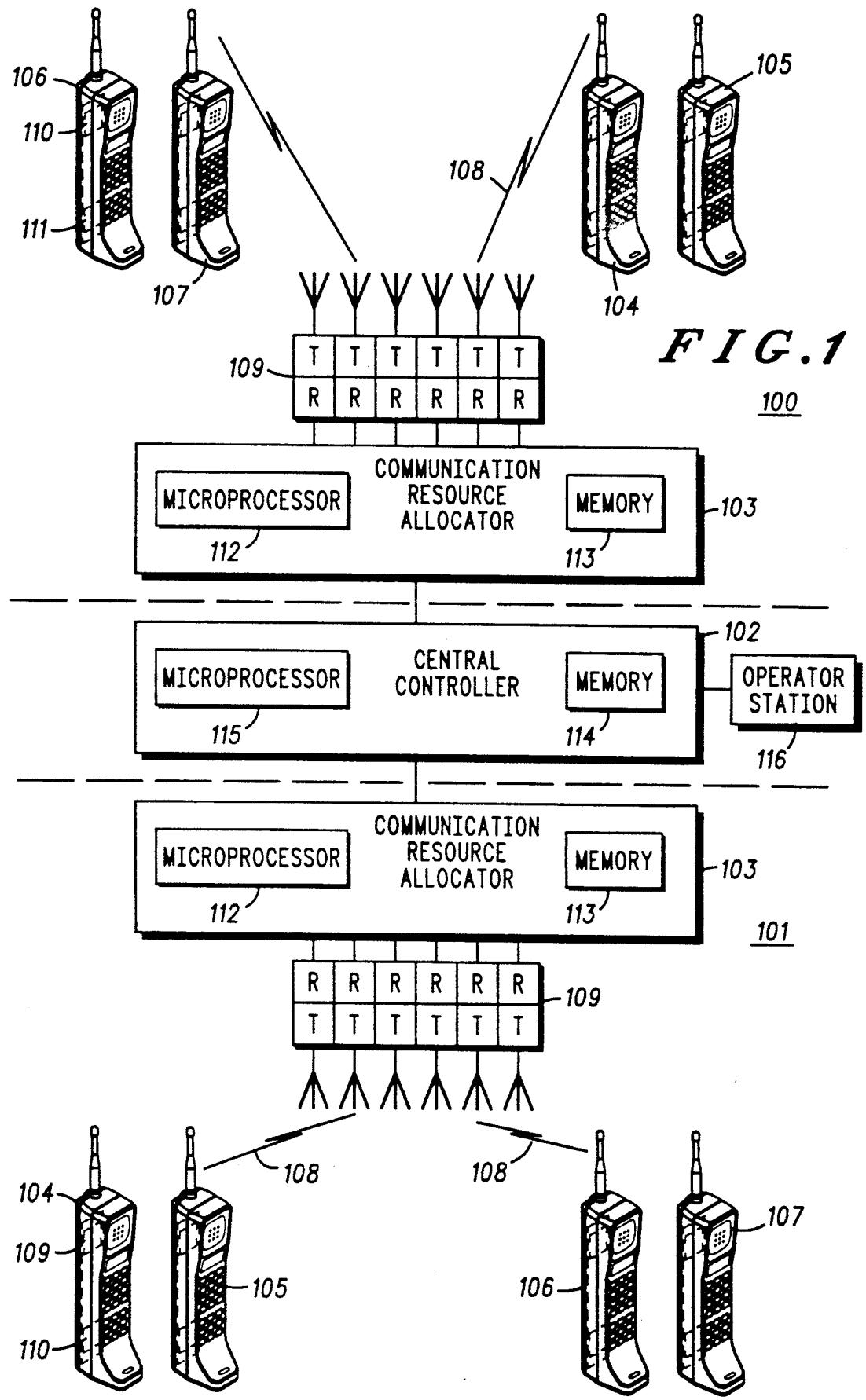
FIG. 1 illustrates a communication system network that may incorporate the present invention.

FIG. 1 illustrates as trunked communication system network that comprises a plurality of communication systems 100, 101 (only two shown), a central controller 102, and a plurality of operator stations 116 (only one shown). Each of the communication systems, which may also be communication sites, comprises a communication resource allocator 103, a limited number of communication resources 108, a number of repeaters, or base stations, 109, and a plurality of communication units 104–107. The operator station, 116 which may be a Motorola Centracom Series II console, comprises group regrouping selection mechanisms as is known in the art. The central controller 102, which may be a Motorola Smart Zone controller, comprises a microprocessor 112, which may be a Motorola 68040 microprocessor, and digital memory 113, which may be RAM, ROM, or any other type of means for storing digital information. Each communication resource allocator 103, which may be a Motorola remote central site controller, comprises a microprocessor 115, which may be a Motorola 6809 microprocessor, and digital memory 113, which may be RAM, ROM, or any type of means for storing digital information. Each of the communication units 104–107, which may be a Motorola STX, comprises a microprocessor 110, which may be a Motorola 68HC11 microprocessor, and digital memory 111, which may be RAM, ROM, or any other type of means for storing digital information. The communication resources 108 are transceived between the communication units 104–107 and the communication resource allocator 103 via the repeaters 109, and wherein one of the communication resources is selected as a control channel.

Generally, the present invention provides a method that allows the central controller to allocate communication resources in only those communication systems that have a communication unit of a communication group in a super communication group registered in it. Once a console selects the communication groups to make up the super communication group, it transmits an identification code of each communication group to the central controller for processing. The central controller, which comprises a data base of communication group/communication system affiliations, accesses this data base to determine which of the communication groups selected by the operator are present in which communication systems. Once the central controller determines this, it groups, on a per communication system basis, only those communication groups that are present in that communication system to form a local super group and stores the local super group information in a local super communication group data base.

Once the super communication group is established, any communication unit in any one of the communication groups in the super group may request system service for the super group. When the central controller receives a request, it accesses the local super communication group data base to determine which communication systems have members of the super group in it. Having done this, the central controller allocates a communication resource in each of the communication systems for the local super group in that communication system.

Figure 2:
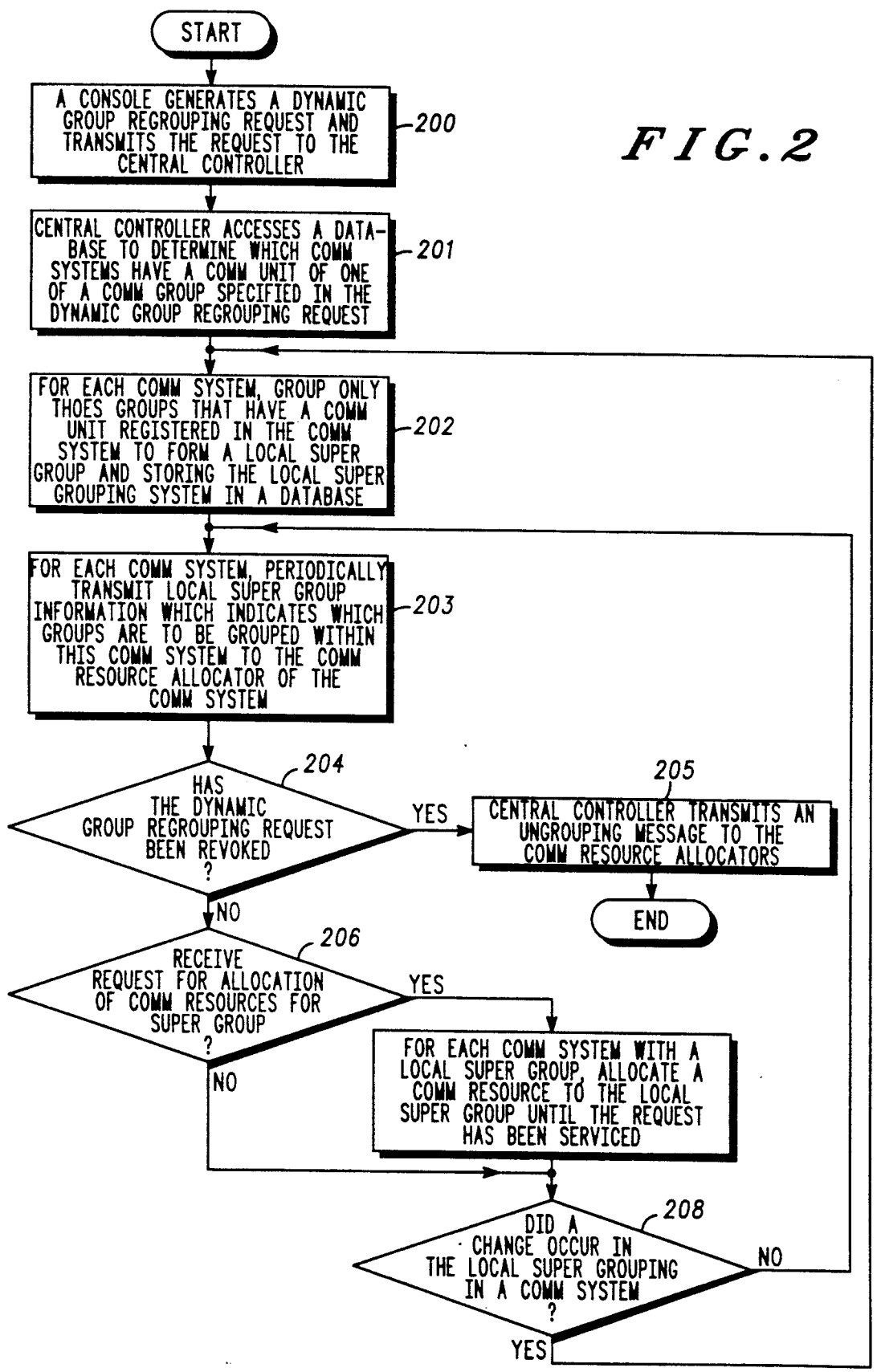
FIG. 2 illustrates a logic diagram that may be used to implement the present invention.

The present invention is more fully described with reference to FIG. 2. At step 200, a console generates a dynamic group regrouping request and transmits the request to the central controller. The dynamic group regrouping request comprises the communication group identification code of each communication group that is to be grouped into a super group. Upon receiving the request, the central controller accesses a communication group/communication system data base to determine which communication systems have a communication unit of the selected super group registered in it 201. The communication group/communication system data base is maintained by the central controller for each communication system based on communication unit registration with the communication system. Registering, by a communication unit with a communication system, is known, thus no further discussion will be presented.

For each communication system, the central controller groups only the groups that have a communication unit registered in the communication system to form a local super communication group 202. The central controller stores the local super group information in a local super group data base 202 and maintains it for each communication system. The central controller, in each communication system that has more than one communication group of the super communication group present, temporarily changes the communication group identification codes of each communication group in the system to the same identification code. The selection of the identification code is arbitrary and may be done by using one of the identification codes of the communication groups in the system. For example, if communication groups 1, 2, 3, and 4 are to be combined in to a super group, but only communication groups 1 and 3 are present in communication system 1, the central controller, for communication system 1, will combine communication groups 1 and 3 in to one local super communication group and use the identification code of communication group 3 as the identification code for the local super communication group. If a communication system does not have a communication unit of the super group registered in it, the central controller does not combine groups within that communication system, nor will the central controller allocate a communication resource in that communication system for the super group when a service request is received.

While the super remains active, the central controller transmits local super group information to each of the communication resource allocators which periodically transmits the information to the communication units in its system 203. The local super communication group information indicates which communication groups are combined in to a local super group within that particular communication system and the identification code of the local super communication group 203. Continuing with the above example, for communication system 1, the local super communication group information indicates that communication groups 1 and 3 are combined in to a local super group and the identification code of the local super group is the identification code of communication group 3. The communication resource allocator continues to transmit the periodic local super communication group information until the dynamic group regrouping request has been revoked 204. When the request has been revoked, the central controller transmits an ungrouping message to the communication resource allocators 205. In addition, the central controller also erases the local super group data base information and ends the process for this particular super group request.

If the dynamic group regrouping request has not been revoked 204, the central controller determines whether it has received a service request for the super communication group 206. If no requests have been received 206, the central controller monitors for changes in local super grouping for each communication system 208. If a change has not occurred 208, the process repeats at step 203. If a change has occurred 208, the process repeats at step 202. A change in local super grouping may occur when a communication unit of a communication group in the super communication group registers in a communication system that previously did not have that particular communication group registered in it. Similarly, a change may occur when a communication unit of a communication group that is part of a local super group leaves that particular communication system such that there are no communication units of that communication group registered in that particular communication system.

When a service request for allocation of a communication resource has been received 206, the central controller determines whether each communication system that has a communication unit of the super group registered in it has a available communication resource. If a communication resource is not available, the central controller reserves a resource in each of the communication systems that has one available and waits for a communication resource to become available in the other communication systems. When all the communication systems have a communication resource available, the central controller allocates the communication resource to the local super communication group in each communication system 207. The allocation of the communication resources remains until the requested service has been fully completed 207. Once the request has been fully completed, the process repeats at 208.

By incorporating the present invention into a trunking communication system network, the central controller can more efficiently process group regrouping requests. With the central controller maintaining a data base of which communication groups are registered in which communication systems, the central controller only has to allocate resources in those sites that have a communication group in it. In addition, the central controller maintains a local super communication group data base to further enhance group regrouping requests. By using the local super communication group data base, the central controller only transmits local super communication group information to a communication system instead of all of the super communication group information thereby reducing control channel traffic.

We claim:

1. In a network of communication systems that are operably coupled via a central controller, wherein each communication system includes a plurality of communication units that are arranged into communication groups, a limited number of communication resources that are transceived via a limited number of repeaters, a plurality of consoles, and a communication resource allocator that allocates via the central controller the limited number of communication resources among the plurality of communication units, a method for processing dynamic group regrouping on a communication system by communication system basis, the method comprises the steps of:
 a) generating, by a console, a dynamic group regrouping request, wherein the dynamic group regrouping request comprises a set of communication groups to be combined into a super communication group;
 b) determining, by the central controller for each of the communication systems, whether at least one of the set of communication groups is registered in a respective communication system;
 c) when at least one of the set of communication groups is registered in said respective communication system, grouping, by the central controller, the at least one of the set of communication groups into a local super communication group;
 d) generating, by the central controller, super communication group information; and
 e) for each communication system that has a local super communication group, transmitting, by the central controller, the super communication group information that pertains to the local super communication group to the communication resource allocator of said each communication system.

2. The method of claim 1 further comprises updating a local super communication group for a communication system when at least one of the set of communication groups enters or leaves the communication system.

3. In the method of claim 1, step (b) further comprises accessing a communication group/communication system database to determine whether the at least one of the set of communication groups is registered in the respective communication system.

4. In the method of claim 3, the grouping of step (c) further comprises generating a local super communication group database that contains the local super communication group for each said respective communication system.

5. In the method of claim 1, the transmitting of super communication information of step (e) further comprises transmitting dynamic group regrouping packets for the local super communication group.

6. In the method of claim 5, the generation of super communication group information further comprises transmitting an allocation message to the communication resource allocator of each communication system that has a local super communication group within it, wherein the allocation message grants a communication resource to the local super communication group.

7. In a network of communication systems that are operably coupled via a central controller, wherein each communication system includes a plurality of communication units that are arranged into communication groups, a limited number of communication resources that are transceived via a limited number of repeaters, a plurality of consoles, and a communication resource allocator that allocates via the central controller the limited number of communication resources among the plurality of communication units, the central controller comprises;
 communication group/communication system database means for storing which communication groups are located within which communication systems;
 local super communication group database means for storing which communication groups of a set of communication groups that are dynamically group regrouped are located within which communication system; and
 determination means, operably coupled to the communication group/communication system database means and the local super communication group database means, for determining which communication groups of the set of communication groups are to be stored in the local super communication group database means.

* * * * *